US008082398B2

(12) United States Patent
Yamada et al.

(10) Patent No.: US 8,082,398 B2
(45) Date of Patent: Dec. 20, 2011

(54) DATA PREFETCHING USING INDIRECT ADDRESSING

(75) Inventors: Tetsuya Yamada, Sagamihara (JP); Naoki Kato, Kodaira (JP); Kesami Hagiwara, Koganel (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 444 days.

(21) Appl. No.: 12/414,656

(22) Filed: Mar. 30, 2009

(65) Prior Publication Data

US 2009/0271576 A1  Oct. 29, 2009

(30) Foreign Application Priority Data

Apr. 8, 2008 (JP) ................................. 2008-100122

(51) Int. Cl.
*G06F 12/02* (2006.01)
(52) U.S. Cl. ........................................ 711/137; 711/123
(58) Field of Classification Search .................... None
See application file for complete search history.

(56) References Cited

U.S. PATENT DOCUMENTS

| | | | | |
|---|---|---|---|---|
| 6,128,703 A * | 10/2000 | Bourekas et al. | ............. | 711/138 |
| 2005/0027921 A1 | 2/2005 | Hirotsu et al. | | |
| 2005/0198439 A1 * | 9/2005 | Lange et al. | ................... | 711/137 |
| 2009/0198904 A1 * | 8/2009 | Arimilli et al. | ................ | 711/137 |
| 2009/0198906 A1 * | 8/2009 | Armilli et al. | ................ | 711/137 |
| 2009/0198950 A1 * | 8/2009 | Arimilli et al. | ............... | 711/205 |

FOREIGN PATENT DOCUMENTS

JP  2004-334773 A  11/2004
JP  2005-201181 A  7/2005

* cited by examiner

*Primary Examiner* — Than Nguyen
(74) *Attorney, Agent, or Firm* — Miles & Stockbridge P.C.

(57) ABSTRACT

There is a need for providing a data processor capable of easily prefetching data from a wide range. A central processing unit is capable of performing a specified instruction that adds an offset to a value of a register to generate an effective address for data. This register can be assigned an intended value in accordance with execution of an instruction. A buffer maintains part of instruction streams and data streams stored in memory. The buffer includes cache memories for storing the instruction stream and the data stream. From the memory, the buffer prefetches a data stream containing data corresponding to an effective address designated by the specified instruction stored in the cache memory. A data prefetch operation is easy because a data stream is prefetched by finding the specified instruction from the fetched instruction stream. Data can be prefetched from a wider range than the use of a PC-relative load instruction.

8 Claims, 9 Drawing Sheets

|   | 0 | 1 | 2 | 3 | 4 | 5 | .. | M |
|---|---|---|---|---|---|---|----|---|
| 0 | 3.2 | 2.3 | 3.2 | 3.6 | 3.3 | 2.9 | .. | 2.7 |
| 1 | 4.2 | 3.5 | 4.2 | 4.1 | 3.8 | 4.4 | .. | 4 |
| 2 | 2.4 | 2.5 | 2.4 | 2.4 | 2.8 | 2.4 | .. | 2.2 |
| 3 | 5.6 | 4.6 | 5.6 | 5.2 | 5.7 | 5.9 | .. | 5.1 |
| 4 | 3.6 | 8.5 | 5.3 | 7.2 | 7.1 | 6.2 | .. | 4.8 |
| 5 | 2.6 | 2.2 | 1.9 | 2.5 | 2.8 | 3.1 | .. | 2.7 |
| 6 | 1.7 | 1.2 | 2.1 | 1.2 | 1.1 | 2.4 | .. | 1.1 |
| : | : | : | : | : | : | : | .. | .. |
| N | 3.2 | 4.9 | 3.8 | 4.2 | 4.1 | 3.9 | .. | 3.6 |

Fig.8

| address | line | instruction | comment |
|---|---|---|---|
| 0 | 0 | instruction 0 | BR:beginning of table (BR1) |
| 2 | | instruction 1 | |
| 4 | | MOV.W @(#4, BR), R0 | table access 1 (data 1) |
| 6 | | instruction 3 | |
| 8 | | instruction 4 | |
| 10 | | MOV.W @(#24, BR), R1 | table access 2 (data 2) |
| 12 | | instruction 6 | |
| 14 | | LDS R2, BR | BR update (BR2) |
| 16 | 1 | instruction 8 | |
| 18 | | instruction 9 | |
| 20 | | instruction 10 | |
| 22 | | MOV.W @(#12,BR), R3 | table access 3 (data 3) |
| .. | .. | .. | |
| 1000 | 63 | BR1 | |
| 1004 | | data 1 | |
| 1024 | 64 | data 2 | |
| .. | .. | .. | |
| 2000 | 125 | BR2 | |
| 2012 | | data 3 | |

DATA PREFETCHING USING INDIRECT ADDRESSING

CLAIM OF PRIORITY

The present application claims priority from Japanese application JP 2008-100122 filed on Apr. 8, 2008, the content of which is hereby incorporated by reference into this application.

FIELD OF THE INVENTION

The present invention relates to data prefetch on a data processor and more specifically to a technology of accelerating ROM access to a semiconductor integrated circuit mounted with ROM such as flash memory.

BACKGROUND OF THE INVENTION

In some cases, flash memory is mounted as read only memory (ROM) on a microcomputer for controlling an automobile internal combustion engine. Programs are stored in the ROM. As the program scale increases accompanied with higher control accuracy, the ROM capacity becomes as large as several megabytes. High-capacity ROM causes a memory access speed to be slower than a processing speed of the CPU. When a memory-access may require several CPU clock cycles. A buffer (or called a ROM cache) is provided for ROM access acceleration. When the ROM cache is hit, one CPU clock cycle is needed. When the ROM cache is missed, the ROM is accessed, requiring several cycles.

An access to the ROM copies one line of memory data (e.g., 256 bits) to the ROM cache. When ROM cache contains no data, the CPU waits for a time interval equivalent to the ROM access. When the CPU uses ROM data, it is desirable to keep data in the ROM cache. As described in Patent Document 1, it is a general practice to provide the ROM cache with a look-ahead feature.

An automobile internal combustion engine control program references a data map based on multiple pieces of sensor information to acquire control values. As described in Patent Document 2, the data map includes a two-dimensional N×M array. The data map is stored in the ROM of an automobile internal combustion engine control microcomputer. The ROM access needs to be accelerated in consideration for the data map structure.

Patent Document 1: Japanese Unexamined Patent Publication No. 2004-334773
Patent Document 2: Japanese Unexamined Patent Publication No. 2005-201181

SUMMARY OF THE INVENTION

As mentioned above, the microcomputer designed for automobile internal combustion engine control is requested to accelerate the ROM access in consideration for the data map structure. When only stored data or instruction in the ROM cache is used for look-ahead, three following cases can be made: (1) the next instruction line during successive instruction execution; (2) an instruction line containing a PC-relative branch instruction; and (3) a data line containing a PC-relative load instruction. A program counter (PC) can be acquired at an address assigned to the instruction stored in the ROM cache. A conventional ROM cache is used to look ahead ROM data such as the PC-relative load instruction (case 3). This instruction is used to acquire a constant data embedded in the C-language program.

For example, a code fragment "const int NUM=100" denotes that a load instruction and data are specified at nearby addresses in the program. Since the data map is a large-scale two-dimensional N×M array, the load instruction and data are specified at distant addresses in the program. Consequently, the PC-relative load instruction is unavailable for the ROM data look-ahead.

It is an object of the present invention to provide a data processor capable of prefetching data from a wide range more easily than the use of a PC-relative load instruction.

It is another object of the present invention to provide a data processor capable of fast accessing data on a data map formed in memory.

These and other objects and novel features of the invention may be readily ascertained by referring to the following description and appended drawings.

The following summarizes representative aspects of the present invention disclosed in the specification.

The central processing unit can execute a specified instruction that generates an effective address of data by adding an offset to a value assigned to the register that can be assigned an intended value in accordance with execution of an instruction. A buffer maintains part of instruction stream and data stream stored in the memory and includes a cache memory for storing the instruction stream and the data stream. From the memory, the buffer prefetches a data stream containing data assigned an effective address designated by the specified instruction in the cache memory when the specified instruction is stored in the cache memory.

The data processor can prefetch data from a wider range than the use of a PC-relative load instruction because data stream prefetch uses an effective address specified in register indirect addressing mode. A data prefetch operation is easy because a data stream is prefetched by finding the specified instruction from the fetched instruction stream.

The following summarizes effects resulting from representative aspects of the present invention disclosed in the specification.

It is possible to prefetch data from a wide range more easily than the use of a PC-relative load instruction.

It is possible to fast access data on a data map formed in memory.

DETAILED DESCRIPTION OF THE PREFERRED EMBODIMENTS

1. Summary of the Preferred Embodiments

The following describes an overview of typical embodiments of the invention disclosed in this application. Reference numerals in the accompanying drawings are parenthesized in the following description about the typical embodiments and just represent examples included in the concept of the corresponding constituent elements.

<1> A data processor according to the invention includes: a central processing unit for performing instructions; a memory for storing instructions and data; and a buffer for maintaining part of instructions and data stored in the memory. The central processing unit has a register that can be assigned an intended value in accordance with execution of an instruction. The central processing unit can execute a specified instruction that generates an effective address of data by adding an offset to a value assigned to the register. The buffer includes: an instruction cache for storing a stream of instructions executed by the central processing unit; a data cache for storing a stream of data used for the central processing unit to execute instructions; and an address generator circuit for generating a data prefetch address. The data prefetch address is used for the data cache that stores a data stream containing data corresponding to an effective address designated by the specified instruction contained in a new instruction stream stored in the instruction cache.

The data processor can prefetch data from a wider range than the use of a PC-relative load instruction because data stream prefetch uses an effective address specified in register indirect addressing mode. A data prefetch operation is easy because a data stream is prefetched by finding the specified instruction from the fetched instruction stream.

<2> In the data processor according to item 1, for example, the instruction cache includes: a line address latch that latches a line address for one cache line in accordance with an address generated by the central processing unit for accessing the memory; and a line instruction latch that maintains an instruction on a cache line selected by the access address. The address generator circuit generates an instruction prefetch address corresponding to an address of a line next to a line address latched by the line address latch. The instruction prefetch address can be also easily generated.

<3> In the data processor according to item 2, for example, the address generator circuit acquires a cache line address of a data cache corresponding to an offset designated by the specified instruction contained in an instruction stream latched by the line instruction latch. The address generator circuit sequentially maintains cached line addresses. The address generator circuit adds a value of the register to a maintained cache line address to output a data prefetch address. Even when multipled at a prefetch addresses are generated from one instruction stream, the address generator circuit just needs to maintain corresponding multiple cache line addresses. It is possible to reduce the circuit scale of the address generator circuit compared to a configuration that computes individual data prefetch addresses in advance and maintains them.

<4> In the data processor according to item 3, the instruction cache responds to a cache miss and outputs an instruction fetch address for designating an instruction stream at an address associated with the miss. The data cache responds to a cache miss and outputs a data fetch address for designating a data stream at an address associated with the miss.

<5> The data processor according to item 4 further includes: an address selection circuit for selecting one of an instruction prefetch address generated by the address generator circuit; a data prefetch address generated by the address generator circuit; an instruction fetch address output when an instruction cache is missed; and a data fetch address output when a data cache is missed. The address selection circuit supplies the selected address to the memory. The address selection circuit selects the data prefetch address, the instruction prefetch address, the data address, and the instruction address in ascending order of priorities.

<6> The data processor according to item 1 is provided as a single chip formed on a single semiconductor substrate.

<7> In the data processor according to item 6, the memory is equivalent to electrically rewritable nonvolatile memory.

<8> A data processor according to another embodiment of the invention includes: a central processing unit for performing instructions; a memory for storing instructions and data; and a buffer for maintaining part of a instruction stream and a data stream stored in the memory. The central processing unit has a register that can be assigned an intended value in accordance with execution of an instruction. The central processing unit can execute a specified instruction that generates an effective address of data by adding an offset to a value assigned to the register. The buffer includes a cache memory for storing the instruction stream and the data stream and prefetches, from the memory, a data stream containing data assigned an effective address designated by the specified instruction in the cache memory when the specified instruction is stored in the cache memory.

The data processor can prefetch data from a wider range than the use of a PC-relative load instruction because data stream prefetch uses an effective address specified in register indirect addressing mode. A data prefetch operation is easy because a data stream is prefetched by finding the specified instruction from the fetched instruction stream.

<9> In the data processor according to item 8, The memory includes a plurality of data maps each of which is N×M in size. The central processing unit provides the register with an address as an origin for a data map to be accessed by the specified instruction.

<10> In the data processor according to item 9, the data map is equivalent to parameter data for device control.

2. Further Detailed Description of the Preferred Embodiments

Embodiments of the present invention will be described in further detail with reference to the accompanying drawings. Throughout all the drawings for illustrating the embodiments, elements having the same function are designated by the same reference numerals and a detailed description is omitted for simplicity.

Figure 2:
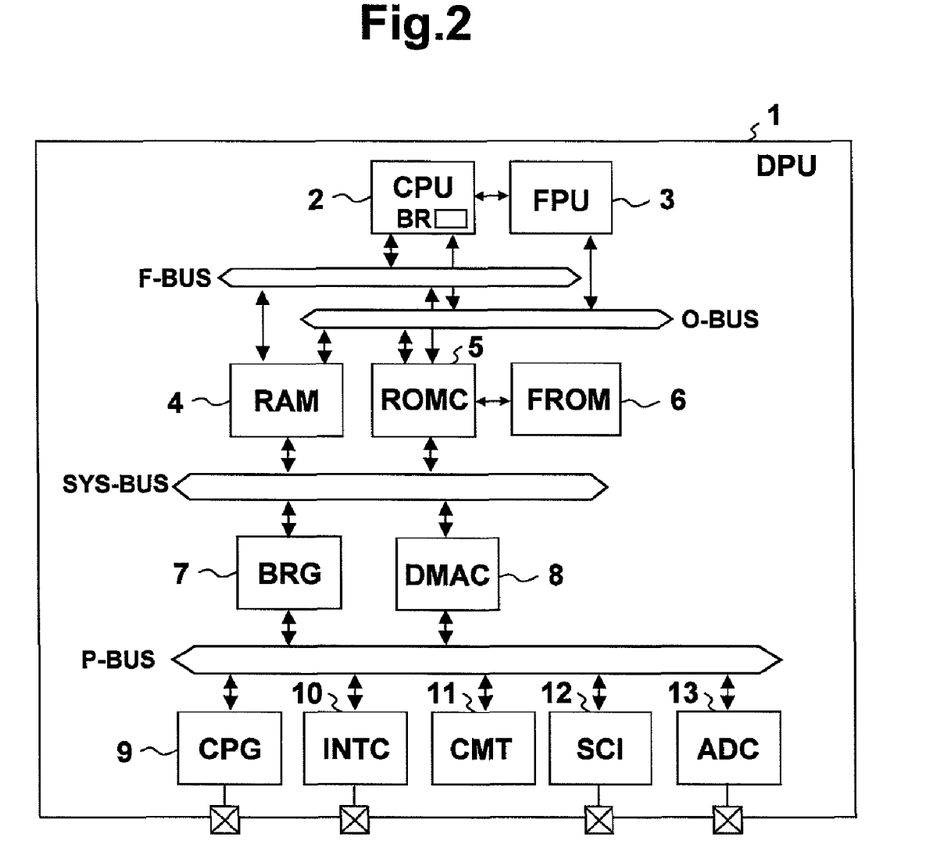
FIG. 2 is a block diagram illustrating the whole of the data processor according to the invention.

FIG. 2 shows an example of a data processor unit (DPU) 1 according to the invention. The data processor 1 in FIG. 2 is formed over one single-crystal silicon semiconductor substrate by means of a manufacturing technology for complementary MOS integrated circuits, though not limited thereto. The data processor 1 includes a ROM cache (ROMC) 5 as buffer memory and flash ROM (FROM) 6 that functions as nonvolatile memory and is comprised of electrically rewritable flash memory. The flash ROM 6 is coupled to the ROM cache 5.

A central processing unit (CPU) 2 having a base register BR is tightly coupled to a floating-point unit (FPU) 3. The CPU 2 and the FPU 3 are coupled to random access memory (RAM) 4 and the ROM cache 5 via an instruction fetch bus F-BUS and an operand bus O-BUS.

A system bus SYS-BUS is coupled to a DMA controller (DMAC) 8 and a bus bridge (BRG) 7 as well as the RAM 4 and the ROM cache 5. The DMA controller (DMAC) 8 and the bus bridge (BRG) 7 interface with a peripheral bus P-BUS. The peripheral bus P-BUS is coupled to: a clock pulse generator (CPG) 9 for generating a clock signal; an interrupt controller (INTC) 10; a compare match timer (CMT) 11; a serial communication interface (SCI) 12; and an A/D converter (ADC) 13 supplied with signals from various sensors.

Figure 1:
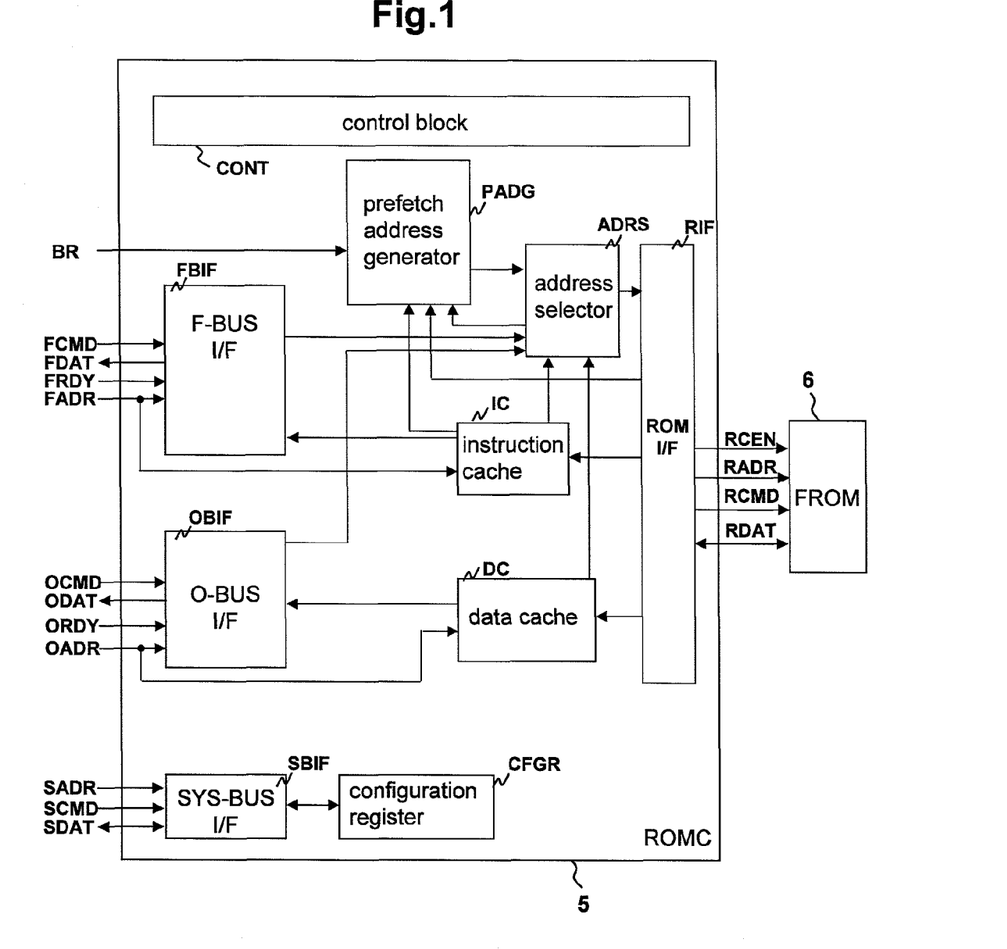
FIG. 1 is a block diagram illustrating the main part of a ROM cache provided for a data processor according to the invention.

FIG. 1 shows a main part of the ROM cache 5. The ROM cache 5 includes the following bus interfaces: an interface circuit FBIF with the instruction fetch bus F-BUS; an interface circuit OBIF with the operand bus O-BUS; an interface circuit SBIF with the system bus S-BUS; and an interface circuit RIF with the flash ROM 6. FCMD, FDAT, FRDY, and FADR are interface signals for the instruction fetch bus F-BUS. FCMD signifies a bus command; FDAT signifies instruction data (or simply referred to as an instruction); FRDY signifies a ready signal; and FADR signifies an address signal. OCMD, ODAT, ORDY, and OADR are interface signals for the operand bus O-BUS. OCMD signifies a bus command; ODAT signifies operand data (or simply referred to as data); ORDY signifies a ready signal; and OADR signifies an address signal. SCMD, SDAT, and SADR are interface signals for the system bus S-BUS. SCMD signifies a bus command; SDAT signifies system data; and OADR signifies an address signal.

The interface circuit RIF is provided with an address selector ADRS that selects an address to the flash ROM 6. The address selector ADRS selects one of addresses generated by the prefetch address generator PADG or the CPU 2 and outputs the address to the interface circuit RIF. A configuration register CFGR is assigned an address for configuring the ROM cache 5 and is coupled to the interface circuit SBIF.

The ROM cache 5 functions as a look-ahead buffer for the flash ROM 6 and includes an instruction cache IC and a data cache DC. The instruction cache IC and the data cache DC hold instructions and data in units of cache lines. One cache line is equivalent to 256 bits, for example. The instruction cache IC receives an address signal FADR and performs an association operation. When the cache is hit, the instruction cache IC returns an instruction to the interface circuit FBIF. When the cache is missed, the instruction cache IC supplies the address selector ADRS with an address associated with the cache miss. The instruction cache IC receives one instruction cache line of instruction from the flash ROM 6 and returns a necessary instruction to the interface circuit FBIF. The data cache IC receives an address signal OADR and performs an association operation. When the cache is hit, the data cache DC returns read data to the interface circuit OBIF. When the cache is missed, the data cache DC supplies the address selector ADRS with an address associated with the cache miss. The data cache DC receives one cache line of data from the flash ROM 6 and returns necessary data to the interface circuit OBIF.

The instruction cache IC and the data cache DC are each configured to be 4-way set associative for four lines. There is no limitation on the number of cache lines or cache techniques. For example, the direct map cache or the fully associative cache may be used.

The prefetch address generator PADG calculates a prefetch address for the flash ROM 6. The prefetch address generator PADG generates an instruction prefetch address that corresponds to the address of the next cache line in an instruction stream containing the instruction being executed. The prefetch address generator PADG generates a data prefetch address based on an effective address in the relevant addressing mode of a BR-relative load instruction. The BR-relative load instruction is a load instruction provided with addressing mode relative to the base register BR. The prefetch address generation function will be described in detail later. Similarly to the BR-relative load instruction, prefetch techniques may include PC-relative branch, PC-relative load, general register indirect branch, and general register indirect load. Detailed descriptions are omitted from this specification for simplicity. CONT in FIG. 1 generically signifies a control section that controls the ROM cache 5.

Figure 3:
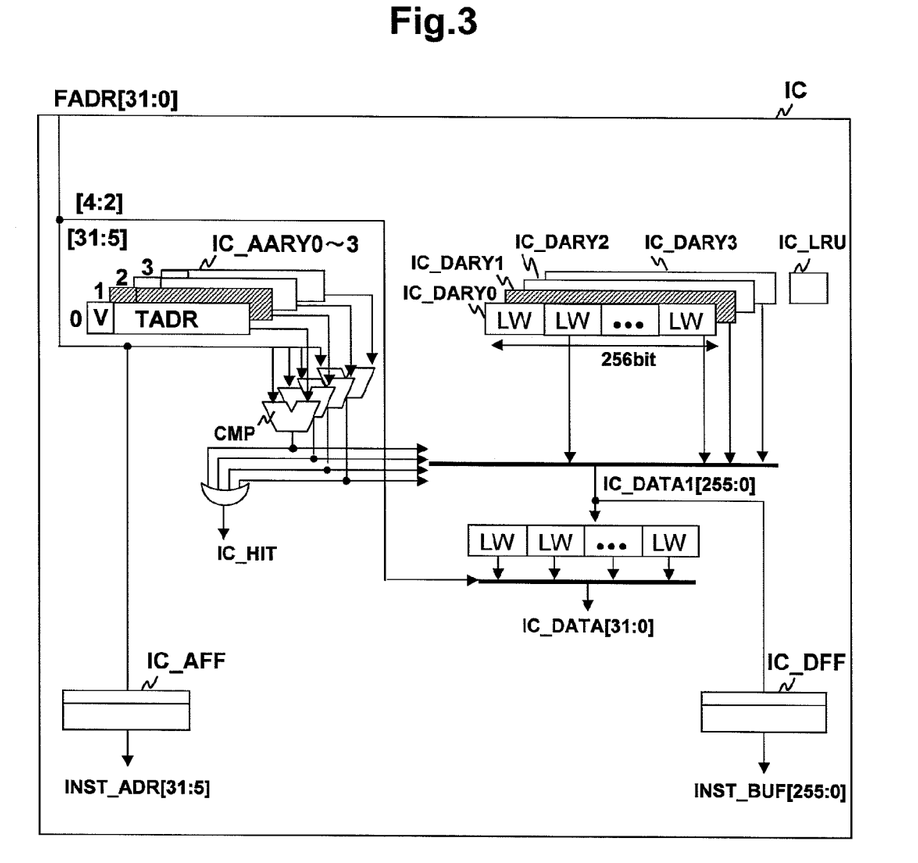
FIG. 3 is a block diagram illustrating an instruction cache in the ROM cache.

FIG. 3 shows an example of the instruction cache IC. The instruction cache IC is configured to be 4-way set associative for four lines. When accessing the flash ROM 6 for an instruction, the CPU 2 first searches the instruction cache IC. When an address in the instruction cache IC is hit, the CPU 2 reads the instruction from the instruction cache IC. When the instruction cache IC is missed, the CPU 2 reads the instruction from the flash ROM 6, and the instruction is output to the CPU 2. When the CPU 2 accesses the flash ROM 6 for an instruction, data is also stored in the instruction cache IC. An instruction fetch supplies an instruction fetch address FADR via the instruction fetch bus F-BUS. When the address is supplied, the CPU 2 simultaneously reads tag addresses TADR from 4-way address arrays IC_AARY0 through IC_AARY3. The CPU 2 compares bits 31 through 5 of an input address with tag addresses. The cache is hit when the comparison results in a match and the compared entries are valid (V=1). The CPU 2 reads one line (256 bits) of data for the corresponding entry from the data arrays DC_DARY0 through DC_DARY3. Using bits 4 through 2 of the input address, the CPU 2 selects one long word (32 bits) from the one line. When the instruction cache IC is read unsuccessfully, the CPU 2 updates the ways using data from the flash ROM 6. For example, the CPU 2 replaces the least recently written entry using the LRU (least recently used) logic. When placing the entry in the look-ahead buffer, the CPU 2 sets the V bit to 1 and updates an LRU flag so that the rewritten entry becomes the most recent one. When the instruction line contains the instruction fetch address FADR, line address INST_ADR and line data INST_BUF are maintained in latch circuits IC_AFF and IC_DFF, respectively. The maintained line address INST_ADR is used for calculating an address on the next instruction line. The maintained line data INST_BUF is used for retrieving a BR-relative load instruction. This specification uses a byte address whose minimum unit is a byte (eight bits).

Figure 4:
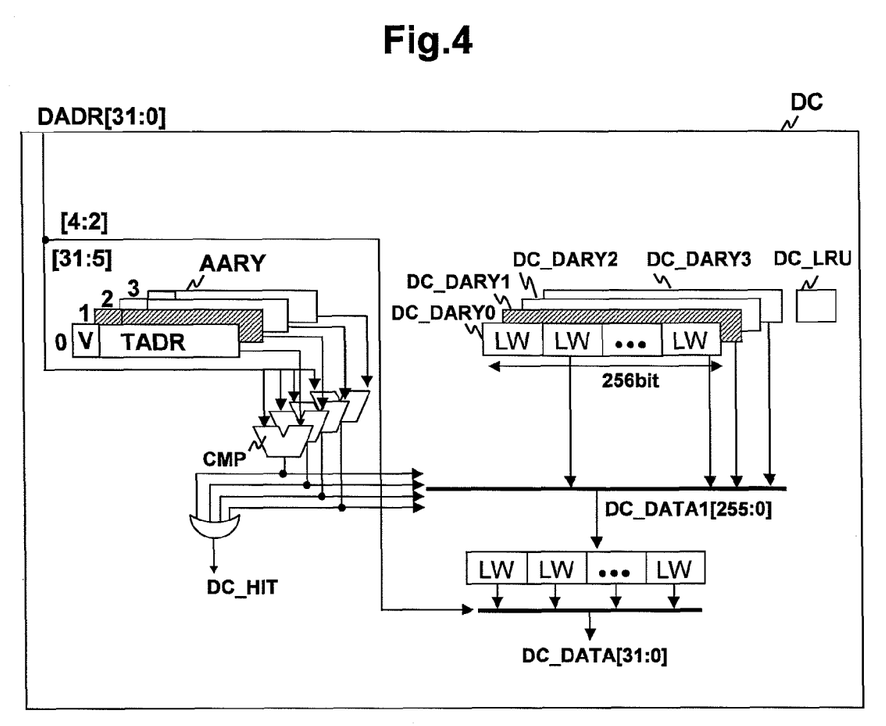
FIG. 4 is a block diagram illustrating a data cache in the ROM cache.

FIG. 4 shows an example of the data cache DC. The data cache DC is configured to be 4-way set associative for four lines. When accessing the flash ROM 6 for data, the CPU 2 first searches the data cache DC. When an address in the data cache DC is hit, the CPU 2 reads the data from the data cache DC. When the data cache DC is missed, the CPU 2 reads the data from the flash ROM 6. The data is output to the CPU 2. When the CPU 2 accesses the flash ROM 6 for data, data is also stored in the data cache DC. A data load supplies an operand address OADR via the operand bus O-BUS. When the address is supplied, the CPU 2 simultaneously reads the tag addresses TADR from the 4-way address arrays DC_AARY0 through DC_AARY3. The CPU 2 compares bits 31 through 5 of an input address with tag addresses. The cache is hit when the comparison results in a match and the compared entries are valid (V=1). The CPU 2 reads one line (256 bits) of data for the corresponding entry from the data arrays DC_DARY0 through DC_DARY3. Using bits 4 through 2 of the input address, the CPU 2 selects one long word (32 bits)

from the one line. When the data cache DC is read unsuccessfully, the CPU 2 updates the ways using data from the flash ROM 6. The CPU 2 can replace the least recently written entry using the LRU logic. When placing the entry in the look-ahead buffer, the CPU 2 sets the V bit to 1 and updates an LRU flag so that the rewritten entry becomes the most recent one.

Figure 5:
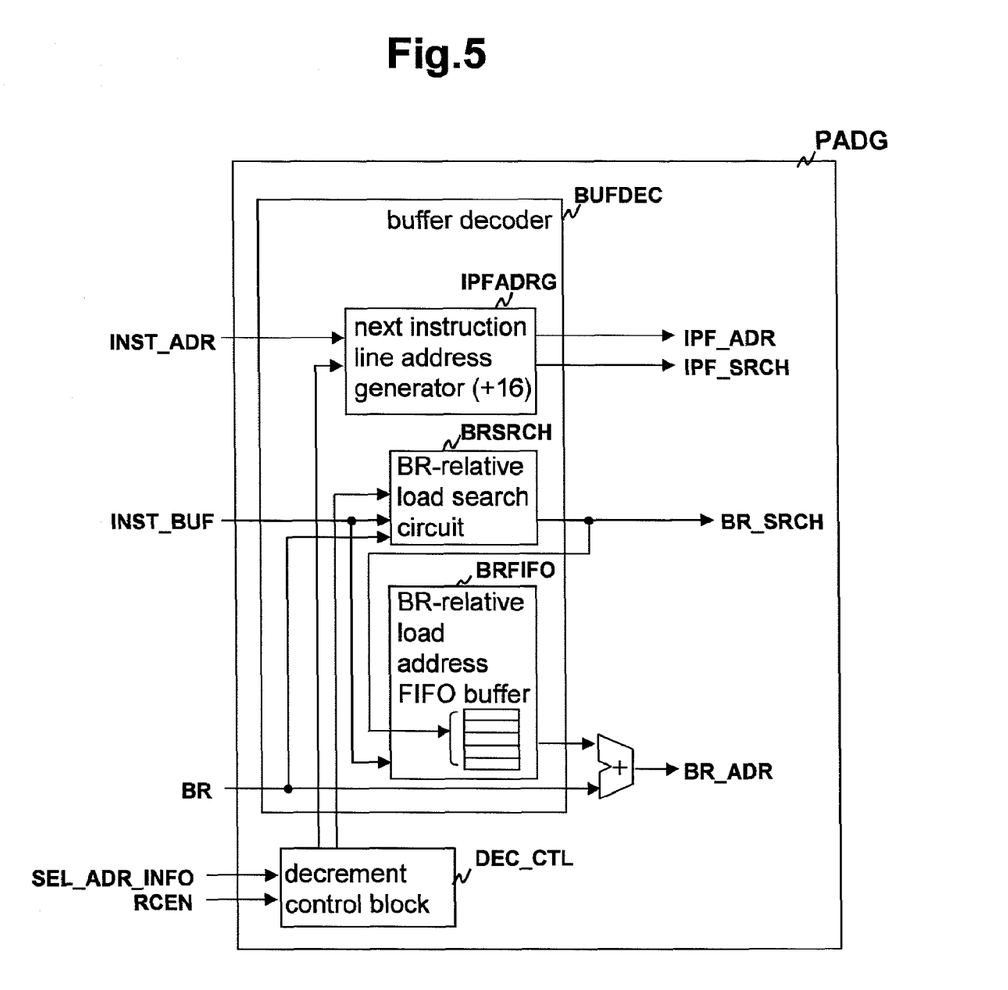
FIG. 5 is a block diagram illustrating a prefetch address generator in the ROM cache.

FIG. 5 shows an example of the prefetch address generator PADG. The prefetch address generator PADG is supplied with the line address INST_ADR and the line data INST_BUF from the instruction cache IC for look-ahead. A next instruction line address generator IPFADRG generates an address IPF_ADR for the next instruction line by adding the line length to the current line address INST_ADR. The address IPF_ADR for the next instruction line is equivalent to an instruction prefetch address. The next instruction line address generator IPFADRG also provides a flag IPF_SRCH for accessing the flash ROM for the next line. A BR-relative load search circuit BRSRCH decodes current line data INST_BUF and retrieves line count BR_SRCH for the BR-relative load instruction contained in the line. That is, the BR-relative load search circuit BRSRCH retrieves the cached line count BR_SRCH of cache lines in the data cache corresponding to all the BR-relative load instructions contained in the current line data INST_BUF. It should be noted that the BR-relative load search circuit BRSRCH does not retrieve the number of BR-relative load instructions. The number of cache lines expresses one even if two or more BR-relative load instructions are in the same cache line. The BR-relative load search circuit is also supplied with a BR register value in consideration for a line boundary. This is because a BR register value may change the line count. A BR-relative load address FIFO buffer BRFIFO decodes the current line data INST_BUF FIFO memory and maintains a line address corresponding to an offset with reference to the BR. That is, the FIFO memory sequentially stores line addresses of the data cache corresponding to offsets specified in all the BR-relative load instructions contained in the current line data INST_BUF. It should be noted that the FIFO memory does not store the offset itself of the BR-relative load instruction. The FIFO memory interlocks with the line count BR_SRCH of the BR-relative load instruction and is managed according to pointers in ascending order of line addresses. A BR-relative line address BR_ADR results from adding a base register BR value to an output value from the BR-relative load address FIFO buffer BRFIFO. The BR-relative line address BR_ADR is equivalent to the data prefetch address. A decrement control section DEC_CTL provides control for decrementing the flag IPF_SRCH for the next instruction line each time an instruction prefetch access is made to the flash ROM 6 on the basis of one instruction cache line. Similarly, the decrement control section DEC_CTL provides control for decrementing the line count BR_SRCH for the BR-relative load instruction each time a data prefetch access is made to the flash ROM 6 on the basis of one instruction cache line.

Figure 6:
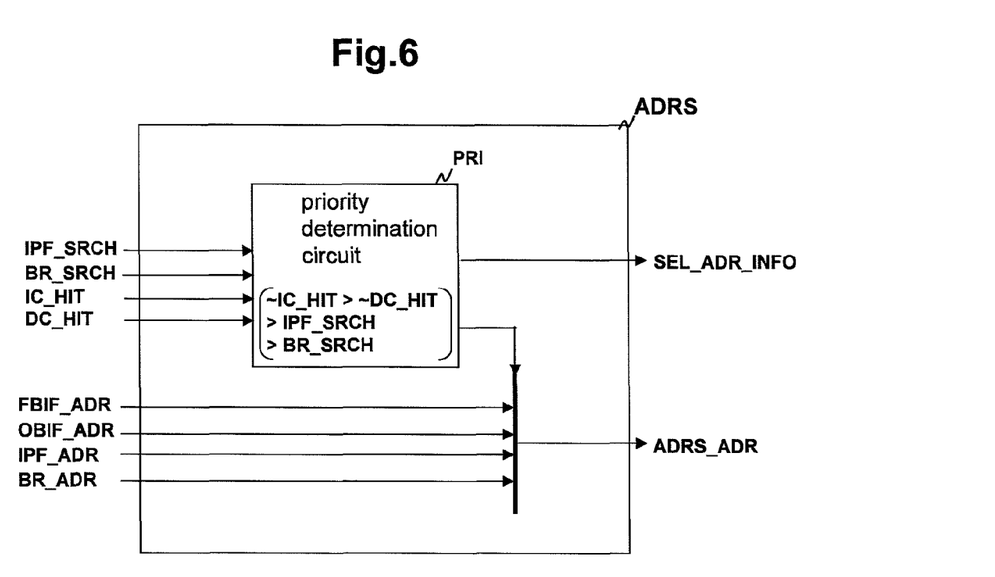
FIG. 6 is a block diagram illustrating an address selector in the ROM cache.

FIG. 6 shows an example of the address selector ADRS in the ROM cache 5. The address selector ADRS selects one of flash ROM accesses such as next instruction line prefetch, line prefetch of the BR-relative load instruction, instruction line fetch caused by an instruction cache miss, and data line fetch caused by a data cache miss. The address selector ADRS outputs the selected address. The next instruction line prefetch, the line prefetch of the BR-relative load instruction, the instruction line fetch, and the data line fetch correspond to addresses IPF_ADR, BR_ADR, FBIF_ADR, and OBIF_ADR, respectively. The addresses for accessing the flash ROM are selected in the following priorities: instruction cache miss (inverted IC_HIT)>data cache miss (inverted DC_HIT)>next instruction line prefetch enabled>line prefetch enabled for BR-relative load instruction.

The following describes operations of the ROM cache 5 according to the above-mentioned configuration with reference to a timing chart.

Figure 7:
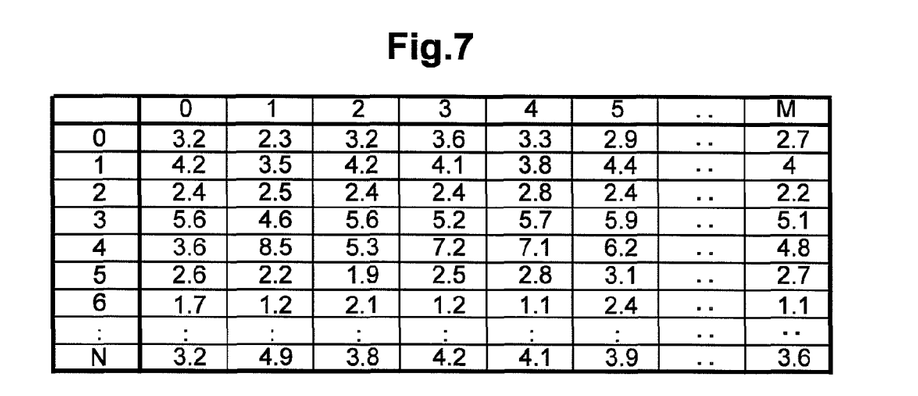
FIG. 7 shows data maps for an automobile internal combustion engine control program.

FIG. 7 shows data maps for the automobile internal combustion engine control program. There are provided two-dimensional N×M data maps (data array). Though not restricted, 16-bit fixed-point data is used. Each data map is large enough to be specifiable based on an offset. It is assumed that a value of the base register BR indicates an origin of data maps. Changing the setting value of the base register can load data beyond the specifiable range based on the offset.

Figure 8:
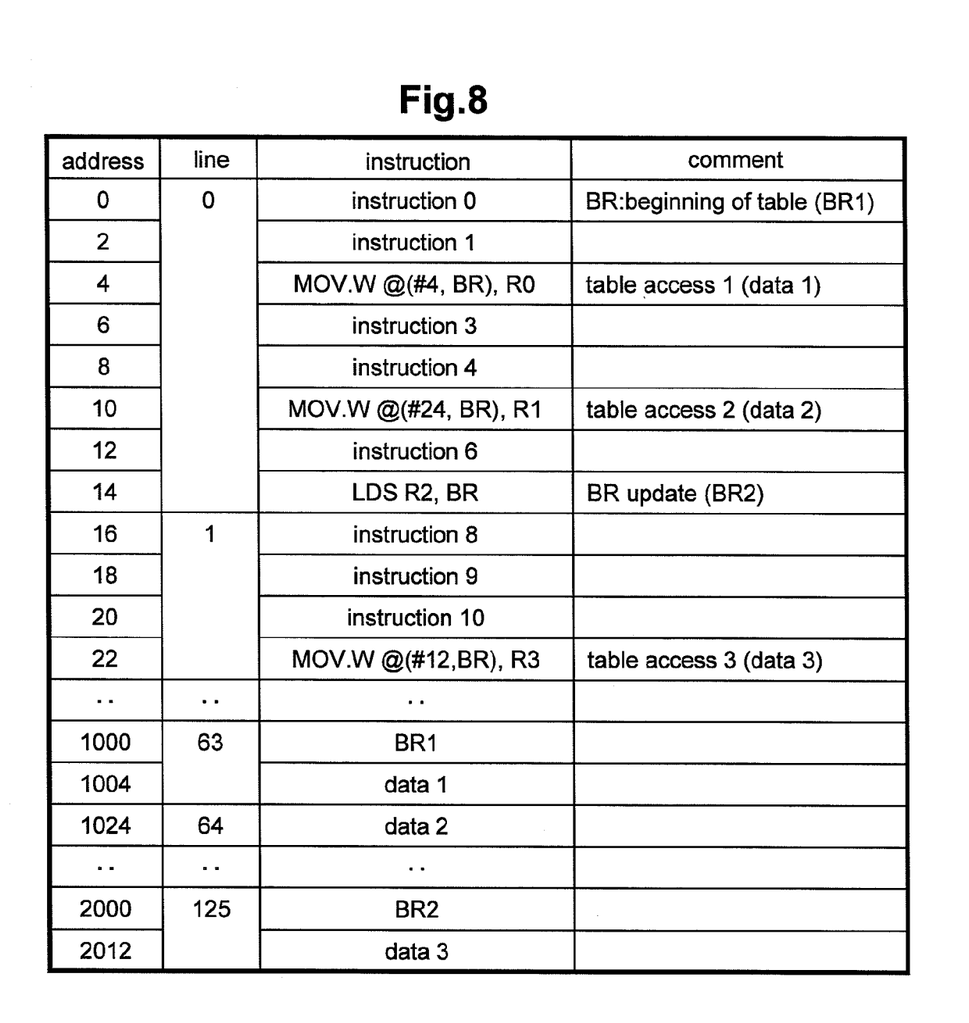
FIG. 8 shows an example of the automobile internal combustion engine control program using base register indirect load instructions for accessing a table.

FIG. 8 shows an example of the automobile internal combustion engine control program using base register relative load instructions for accessing a table. At address 0, the program assumes that a BR base register stores table start address 1000 for the data maps. The instructions at addresses 4 and 10 add offsets 4 and 24 to load at addresses 1004 and 1024. The instruction at address 14 updates the BR to address 2000. The instruction at address 22 adds offset 12 to load data at address 2012. The source program description uses a pragma to direct the compiler to store an address as the data map reference in the base register BR.

Figure 9:
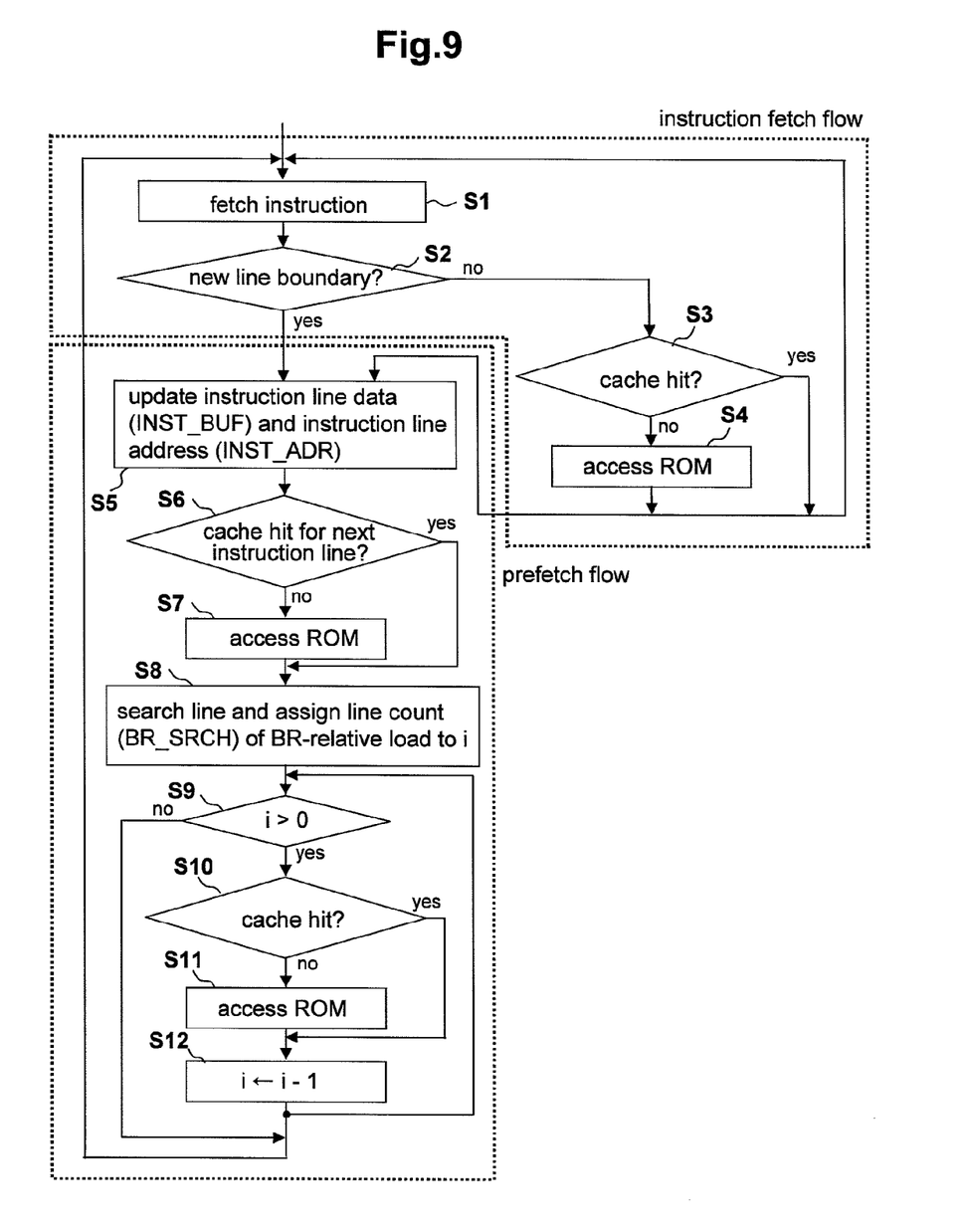
FIG. 9 an instruction fetch and a prefetch operation on the ROM cache when the automobile internal combustion engine control program in FIG. 8 is executed.

FIG. 9 is a flow chart showing implementation of the automobile internal combustion engine control program in FIG. 8 using the ROM cache ROMC in FIG. 2. The flow chart includes an instruction fetch flow and a prefetch flow. The program in FIG. 8 excludes a branch instruction and a data load instruction except the BR-relative load instruction. Accordingly, the flow chart also excludes flows for a branch instruction and a data load instruction except the BR-relative load instruction. In the instruction fetch flow, the program performs an instruction fetch (S1). The program determines whether or not an instruction fetch address from the CPU 2 indicates a new line boundary (S2). When a new line boundary is identified, the program starts the prefetch flow. When a new line boundary is not identified, the program determines whether or not the instruction fetch address hits the instruction cache IC or the data cache DC in the ROM cache ROMC (S3). When the cache is hit, the program performs an instruction fetch from the line corresponding to either cache. When the cache is missed, the program accesses the flash ROM (S4).

In the prefetch flow, the program updates the instruction line data INST_BUF and the instruction line address INST_ADR in accordance with the new line (S5). The program performs an instruction prefetch on the line next to the instruction line address. When the cache is hit for the next instruction line, the program need not access the flash ROM (S6). When the cache is missed, the program accesses the flash ROM (S6 and S7). The program performs an instruction prefetch on the instruction cache. Though omitted from the flow chart, an IPF_SRCH flag is used to manage whether or not a new line prefetch is performed. The program performs a line prefetch of the BR-relative load. The program retrieves instruction line data INST_BUF and assign the line count (BR_SRCH) of the BR-relative load to i (S8). The program repeats the instruction until i becomes 0 to perform the prefetch of the BR-relative load (S9 to S12). The program accesses the flash ROM only when the data cache DC is missed (S11). The program follows the above-mentioned flow to perform the instruction fetch and the line prefetch for the next instruction line and the BR-relative load instruction.

Figure 10:
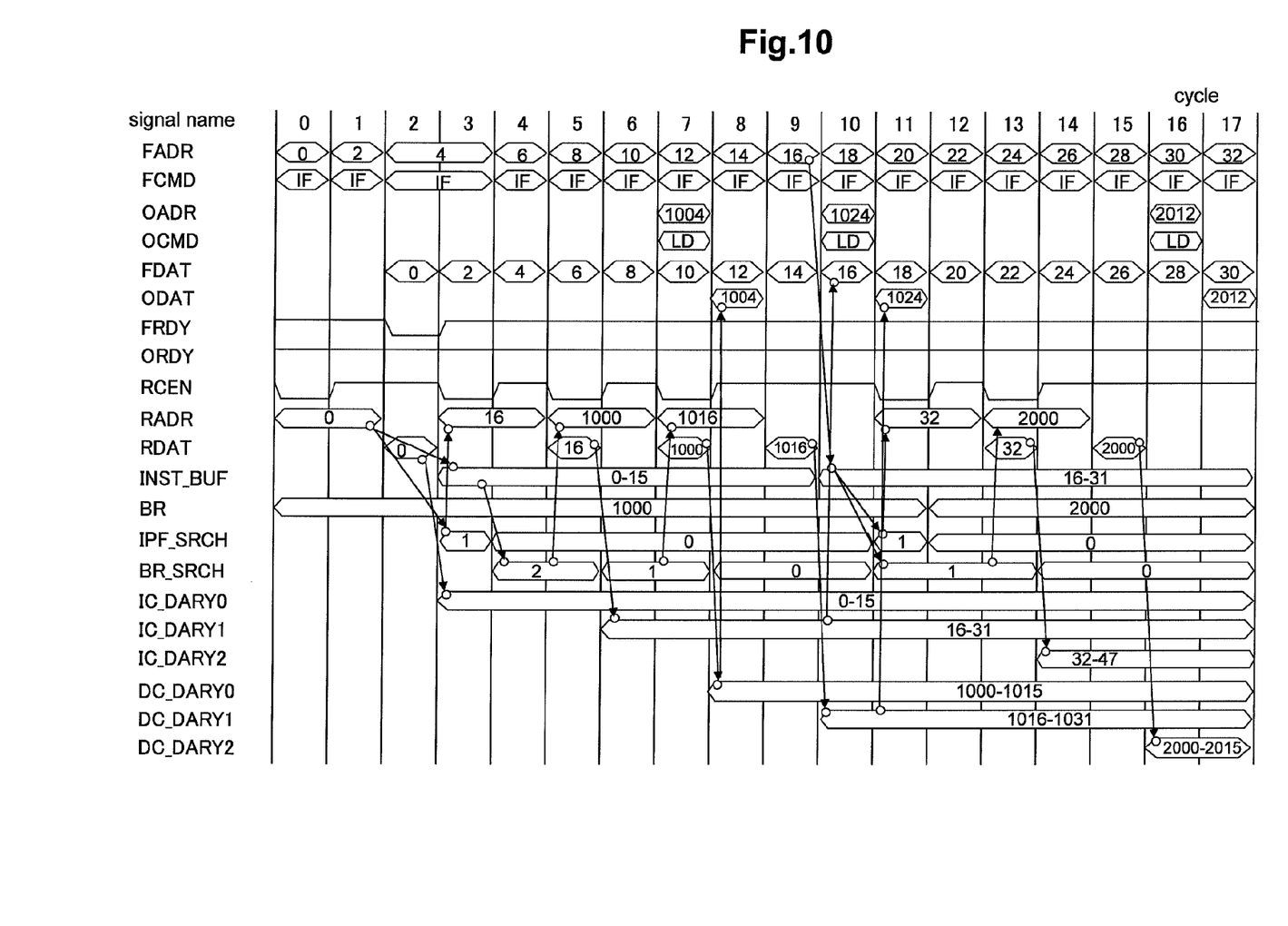
FIG. 10 shows a timing chart when the automobile internal combustion engine control program in FIG. 8 is executed using the ROM cache in FIG. 2.

FIG. 10 shows a timing chart when the automobile internal combustion engine control program in FIG. 8 is executed using the ROM cache in FIG. 2. An access to the flash ROM is assumed to be latency 2 and throughput 2.

At cycle 0, the program performs the instruction fetch flow in FIG. 9. To fetch the instruction at address 0, the program accesses the flash ROM. At cycle 2, the program acquires data from the flash ROM 6. The instruction fetch flow starts each time the instruction address (FADR) from the CPU 2 is updated.

Since address 0 represents a new line boundary, the prefetch flow starts when data is acquired from the flash ROM 6. At cycle 3, the program updates the instruction line data (INST_BUF) and the instruction line address (INST_ADR) though omitted from the drawing. The prefetch flow sequentially prefetches the next instruction line and the BR-relative load line. At cycle 3, the program performs the prefetch at the next instruction line address 16 because the prefetch address generator PADG sets the next instruction line flag IPF_SRCH to 1. At cycle 4, the program retrieves a BR-relative load line and stores 2 in BR_SRCH as data 1 and data 2 of the line corresponding to the BR-relative load instruction. At cycles 5 and 7, the program sequentially prefetches the line corresponding to the BR-relative load instruction to terminate the prefetch flow for the line. At cycle 7 (OADR=1004) and cycle 10 (OADR=1024), the CPU 2 loads the BR-relative load instruction. The program need not access the flash ROM because the prefetched data cache is hit. At cycle 9, the CPU 2 specifies the instruction address to be the next line (address 16). However, the program does not access the flash ROM because the prefetched instruction cache is hit.

At cycle 9, the instruction address is set to the next line (FADR=16). Therefore, the prefetch flow restarts. At cycle 11, the program prefetches the cache for the instruction line. At cycle 13, the program prefetches the cache for the BR-relative load line. At cycle 16, the program performs the BR-relative load instruction (OADR=2012) for loading. The program does not access the flash ROM because the prefetched data cache is hit.

The ROM cache 5 is prefetched for the next instruction line and the BR-relative load. The ROM cache 5 is hit when the CPU accesses an instruction or loads data. No access is made to the flash ROM 6, thus accelerating the data processing.

While there have been described specific preferred embodiments of the present invention, it is to be distinctly understood that the present invention is not limited thereto but may be otherwise variously embodied within the spirit and scope of the invention.

For example, the instruction cache and the data cache may be provided as independent cache memories or as a single unified cache memory. The cache line size, data bus width, the number of address bits, and the like can be changed as needed. The memory is not limited to the flash memory and may be replaced by the other types of nonvolatile memory. The internal bus configuration of the data processor, types of on-chip circuit modules, and the like can be changed as needed.

What is claimed is:

1. A data processor comprising:
a central processing unit performing instructions;
a memory storing instructions and data; and
a buffer maintaining part of instructions and data stored in the memory,
wherein the central processing unit has a register, into which an intended value is set in accordance with execution of an instruction, and executes a specified instruction that generates an effective address of data by adding an offset to a value set to the register,
wherein the buffer includes:
an instruction cache storing a stream of instructions executed by the central processing unit;
a data cache storing a stream of data used for the central processing unit to execute instructions; and
an address generator circuit generating a data prefetch address, the data prefetch address being used for the data cache that stores a data stream containing data corresponding to an effective address designated by the specified instruction contained in a new instruction stream stored in the instruction cache,
wherein the instruction cache includes:
a line address latch latching a line address for one cache line in accordance with an address generated by the central processing unit for accessing the memory; and
a line instruction latch maintaining an instruction on a cache line selected by the access address,
wherein the address generator circuit generates an instruction prefetch address corresponding to an address of a line next to a line address latched by the line address latch, acquires a cache line address of a data cache corresponding to an offset designated by the specified instruction contained in an instruction stream latched by the line instruction latch, sequentially maintains cached line addresses, and adds a value of the register to a maintained cache line address to output a data prefetch address.

2. The data processor according to claim 1,
wherein the instruction cache responds to a cache miss and outputs an instruction fetch address for designating an instruction stream at an address associated with the miss, and
wherein the data cache responds to a cache miss and outputs a data fetch address for designating a data stream at an address associated with the miss.

3. The data processor according to claim 2, further comprising:
an address selection circuit selecting one of an instruction prefetch address generated by the address generator circuit, a data prefetch address generated by the address generator circuit, an instruction fetch address output when an instruction cache is missed, and a data fetch address output when a data cache is missed, and supplies the selected address to the memory, and
wherein the address selection circuit selects the data prefetch address, the instruction prefetch address, the data address, and the instruction address in ascending order of priorities.

4. The data processor according to claim 1,
wherein the data processor is formed over a single semiconductor substrate.

5. The data processor according to claim 4,
wherein the memory is equivalent to electrically rewritable nonvolatile memory.

6. A data processor comprising:
a central processing unit performing instructions;
a memory storing instructions and data; and
a buffer maintaining part of a instruction stream and a data stream stored in the memory,
wherein the central processing unit has a register , into which an intended value is set in accordance with execution of an instruction, and executes a specified instruction that generates an effective address of data by adding an offset to a value assigned to the register, and wherein the buffer includes a cache memory storing the instruction stream and the data stream and prefetches, from the memory, a data stream containing data corresponding to an effective address designated by the specified instruction to the cache memory when the specified instruction is stored in the cache memory.

7. The data processor according to claim 6,
wherein the memory includes a plurality of data maps each of which is N×M in size, and
wherein the central processing unit provides the register with an address as an origin for a data map to be accessed by the specified instruction.

8. The data processor according to claim 7,
wherein the data map is equivalent to parameter data for device control.

\* \* \* \* \*